United States Patent [19]

Masterson et al.

[11] Patent Number: 5,275,835
[45] Date of Patent: Jan. 4, 1994

[54] PROCESS FOR PREPARING REDUCED CALORIE FLAVORED CONFECTIONERY COMPOSITIONS USING DYNAMIC TEMPERING CONDITIONS

[75] Inventors: Daniel J. Masterson; Mark A. Besserman, both of Cincinnati; Cornelius H. Japikse, Wyoming; Claudia A. Smith, Cincinnati, all of Ohio

[73] Assignee: The Procter & Gamble Company, Cincinnati, Ohio

[21] Appl. No.: 954,198

[22] Filed: Sep. 29, 1992

[51] Int. Cl.⁵ .............................................. A23G 1/00
[52] U.S. Cl. ................................... 426/607; 426/613; 426/660; 426/804
[58] Field of Search .................. 426/660, 804, 607, 613

[56] References Cited

U.S. PATENT DOCUMENTS

| | | | |
|---|---|---|---|
| 4,059,047 | 11/1977 | Sollich | 99/455 |
| 4,178,105 | 12/1979 | Sollich | 366/312 |
| 4,648,315 | 3/1987 | Blum | 99/455 |
| 4,859,483 | 8/1989 | Sollich | 426/519 |
| 4,888,196 | 12/1989 | Ehrman et al. | 426/601 |
| 5,023,106 | 6/1991 | Ehrman et al. | 426/660 |
| 5,038,572 | 8/1991 | De Bruijne et al. | 62/68 |
| 5,066,510 | 11/1991 | Ehrman et al. | 426/607 |
| 5,071,669 | 12/1991 | Seiden | 426/660 |
| 5,188,853 | 2/1993 | Sollich | 426/660 |
| 5,188,858 | 2/1993 | Stipp et al. | 426/660 |

OTHER PUBLICATIONS

Peters et al., *J. of the American College of Toxicology*, Mary Ann Liebert, Inc. Publishers, vol. 10, No. 3, 1991, "Caprenin 3. Absorption and Caloric Value in Adult Humans", pp. 357-367.

Beckett, *Industrial Chocolate Manufacture and Use*, Van Nostrand Reinhold, New York, 1988, pp. 182-189.

Greenwell, *JAOCS*, Mar., 1981, "Chilling and Crystallization of Shortenings and Margarines", pp. 206-207.

Wiedermann, *JAOCS*, Nov., 1978, "Margarine and Margarine Oil, Formulation and Control", pp. 823-829.

Haighton, *JAOCS*, Jun., 1976 (vol. 53), "Blending, Chilling, and Tempering of Margarine and Shortening", pp. 397-399.

Schwitzer, *Margarine and Other Food Fats*, Interscience Publishers, New York, 1956, pp. 287-289.

Joyner, *JAOCS*, Nov., 1953, "The Plasticizing of Edible Fats", pp. 526-535.

Primary Examiner—Jeanette Hunter
Attorney, Agent, or Firm—George W. Allen; Rose Ann Dabek

[57] ABSTRACT

An improved process is disclosed for preparing flavored confectionery compositions containing certain reduced calorie cocoa butter substitute fats. The improvement involves rapidly cooling such a composition from a non-crystalline state to a temperature of less than about 70° F. (21.1° C.) using a swept-wall, scraped-wall, or screw-type heat exchanger. The cooled composition is then conditioned for at least about 5 minutes by warming it to a temperature of about 70° to 85° F. (21.1° to 29.4° C.) in an agitated vessel before further processing into finished confectionery pieces. Under these dynamic tempering conditions, bloom-stable products can be produced much faster than with static tempering.

24 Claims, No Drawings

PROCESS FOR PREPARING REDUCED CALORIE FLAVORED CONFECTIONERY COMPOSITIONS USING DYNAMIC TEMPERING CONDITIONS

TECHNICAL FIELD

This application relates to a process for preparing reduced calorie flavored confectionery compositions, in particular chocolate flavored confectionery compositions, containing certain reduced calorie substitute fats. This application particularly relates to a process for preparing bloom stable confectionery compositions using certain dynamic tempering conditions.

BACKGROUND OF THE INVENTION

Chocolate derives its desirable eating qualities largely from the melting properties of cocoa butter which is typically present at 25–35% by weight. At room temperature (70°–74° F., 21.1°–23.3° C.) cocoa butter is a firm solid. Firmness is desirable not only to provide "snap" at initial bite, but also to resist deformation and surface marking of the chocolate from time of manufacture to time of consumption.

Above room temperature, cocoa butter melts progressively until it is fully melted near 93°–94° F. (33.9°–34.4° C.), and is therefore entirely liquid below body temperature (98.6° F., 37° C.). This rapid melting at mouth temperature ("mouthmelt") provides a smooth, creamy consistency during eating and insures rapid release of chocolate flavors to the mouth. The relatively sharp melting behavior just a few degrees below body temperature is unique to cocoa butter among natural fats.

The melting behavior of cocoa butter is the result of its unique triglyceride composition. However, this unique triglyceride composition, like the triglyceride composition of other natural fats, is relatively high in calories. Approximately 50% of the calories in chocolate products come from the fat which is exclusively or predominantly cocoa butter. This means that persons who must restrict their intake of calories must either reduce the amount of chocolate products they consume, or in the extreme case, completely exclude such products from their diet. Accordingly, it would be desirable to be able to replace all or a portion of the cocoa butter present in such chocolate products with a substitute fat having fewer calories, while maintaining the desirable physical properties of cocoa butter in chocolate products.

The selection of a reduced calorie substitute fat for cocoa butter is not straightforward. First, the substitute fat must be less efficiently absorbed and/or metabolized by the body in order to exhibit a lower caloric density. Second, the substitute fat should temper and crystallize into a solid form that is very sharp melting and has mouth-melt characteristics the same, or similar, as those of cocoa butter, or combinations of cocoa butter and milkfat, present in confectionery products. Third, the crystalline form of the substitute fat should be stable under typical conditions of confectionery product distribution and handling without any significant change in the mouthmelt characteristics or appearance of the substitute fat-containing confectionery product. Such undesirable changes include the development of a waxy or grainy mouthfeel and the development of bloom, i.e. a whitish or grayish discoloration visible on the surface, or sometimes in the interior, of the confectionery product. These changes can be caused by the growth of excessively large fat crystals, the transformation of the fat crystals into a higher melting polymorphic form, the presence of too high a level of lower-melting fatty components, or incompatibility between the substitute fat and other fats present in the confectionery product, in particular cocoa butter that is typically present in the chocolate liquor and/or cocoa powder used to impart a chocolate flavoring to such products. Lastly, the substitute fat should be processable in current commercial operations used to make confectionery products.

One reduced calorie fat that has been found to be useful as a cocoa butter substitute comprises a fairly high level (e.g., at least about 85%) of combined MML and MLM triglycerides, where M is typically a mixture of $C_8$ and $C_{10}$ saturated fatty acids and L is predominantly behenic acid. See Ehrman et al. U.S. Pat. No. 4,888,196, issued Dec. 9, 1989. Unlike other cocoa butter replacers, this reduced calorie cocoa butter substitute fat exhibits polymorphism and needs to be tempered or precrystallized and then crystallized into its stable $\beta$-3 crystalline phase, just as cocoa butter does. However, if chocolate products based on this reduced-calorie cocoa butter substitute fat are tempered using typical equipment and conditions suitable for cocoa butter-based chocolate products (i.e. rapidly cooling to about 82° to 86° F. (27.8° to 30.0° C.) and then warming to about 88° to 93° F. (31.1° to 33.9° C.), the products do not harden sufficiently when cooled to be wrapped or otherwise packaged, nor shrink sufficiently in molds to be easily demolded with glossy appearance, and will develop bloom.

The Ehrman et al. patent discloses an alternative tempering process for obtaining flavored confectionery products using this reduced calorie cocoa butter substitute fat. This tempering process involves rapidly cooling the flavored confectionery composition to a temperature of about 57° (13.9° C.) or less. This cooled composition is then held at this temperature for at least about 16 hours, which is sufficient to form, or nucleate, an effective amount of $\beta$-3 crystals from a portion of the reduced calorie cocoa butter substitute fat. The cooled composition is then warmed to a temperature in the range of from about 57° to about 72° F. (about 13.9° to about 22.2° C.) to transform the remaining portion of the reduced calorie cocoa butter substitute fat into the stable $\beta$-3 crystalline phase, in about 4 to about 120 hours.

Using the tempering scheme disclosed in the Ehrman et al. patent, it typically takes from about 1 to about 3 days after preparing the molten chocolate mass to obtain chocolate-flavored products which are stable against resulting bloom formation, especially when subjected to thermal stress. Accordingly, it would be desirable to develop a process for preparing chocolate-flavored confectionery compositions containing these reduced calorie cocoa butter substitute fats that does not require a prolonged tempering scheme according to the Ehrman et al. patent to provide a bloom-stable $\beta$-3 phase. In particular, it would be desirable to develop a process for preparing these reduced calorie chocolate-flavored confectionery compositions that can be more easily adapted to standard manufacturing and packaging processes used in commercial cocoa butter-based chocolate operations.

SUMMARY OF THE INVENTION

The present invention provides an improved process for preparing flavored confectionery compositions containing the reduced calorie cocoa butter substitute fats disclosed in the Ehrman et al. patent. Such reduced calorie cocoa butter substitute fats are present in the compositions prepared by this process in the stable $\beta$-3 phase.

The process herein comprises the steps of
(I) forming a temperable, flavored confectionery composition of the type hereinafter defined;
(II) dynamically tempering this flavored confectionery composition of Step (I) by rapidly cooling this composition from a non-crystalline state to a temperature of less than about 70° F. (21.1° C.) and by then warming the composition to from about 70° F. to about 85° F. (21.1° C to 29.4° C.) while subjecting the composition to shear agitation; and thereafter
(III) setting the tempered composition by cooling and/or warming the tempered composition in such a manner such that the reduced calorie cocoa butter substitute fat transforms into a stable $\beta$-3 crystalline phase.

The temperable composition formed in Step (I) comprises a flavor-enhancing amount of a flavor component; from about 15% to about 45% of a fat component, and from about 55% to about 85% of other nonfat confectionery ingredients. At least 70% by weight of the fat component comprises a reduced calorie cocoa butter substitute fat. The fat component also comprises up to about 20% by weight of the fat component of milkfat; up to about 20% by weight of the fat component of cocoa butter, and no more than about 4% by weight of the fat component of diglycerides.

The reduced calorie cocoa butter substitute fat which is used in the fat component has:
(a) at least about 85% by weight of the substitute fat of combined MLM and MML triglycerides;
(b) no more than about 10% by weight of the substitute fat of combined LLM and LML triglycerides;
(c) no more than about 4% by weight of the substitute fat of MMM triglycerides; and
(d) no more than about 10% by weight of the substitute fat of other triglycerides.

In these triglycerides, M is a $C_6$ to $C_{10}$ saturated fatty acid residue and L is a $C_{20}$ to $C_{24}$ saturated acid residue. These triglycerides are further characterized by having a fatty acid composition which comprises
(x) from about 35% to about 60% combined $C_8$ and $C_{10}$ saturated fatty acids,
(y) a ratio of $C_8$ to $C_{10}$ saturated fatty acids of from about 1:5 to about 25:1, and
(z) from about 35% to about 60% behenic fatty acid.

In the dynamic tempering Step (II) of the process herein, the flavored confectionery composition is cooled from the non-crystalline state at a rate of from about 0.8° F./min. to about 150° F./min. (0.4° C./min. to 83° C./min.). During this tempering step, the flavored confectionery composition is worked to impart shear agitation to the composition to the extent of shear rates ranging from about 400 to about 8000 seconds$^{-1}$. After the cooling step, the composition is subjected to a conditioning procedure whereby the composition is warmed under agitation. The conditioning step will generally last for at least about 5 minutes.

The dynamic tempering conditions according to the improved process of the present invention provide the ability to obtain bloom-stable, flavored (and especially chocolate-flavored) confectionery compositions containing the reduced calorie cocoa butter substitute fat of the Ehrman et al. patent without the need for prolonged tempering. Because prolonged tempering is not required, the improved process of the present invention can be easily adapted to standard manufacturing and packaging equipment used with cocoa butter-based products.

DETAILED DESCRIPTION OF THE INVENTION

A. Definitions

The polymorphic phases, and particularly the "$\beta$-3" phase referred to herein, are crystalline fat phases well known to those skilled in the art of fat X-ray crystallography. See Wille et al "Polymorphism of Cocoa Butter," *J. Am. Oil Chem. Soc.*, Vol. 43 (1966), pp. 491–96, which describes the six crystalline fat phases of cocoa butter.

As used herein, the term "stable $\beta$-3 phase" refers to a a $\beta$-3 crystalline phase having a high population of small fat crystals which is resistant to bloom formation.

As used herein, the term "tempering" means partial precrystallization of a formulation containing a polymorphic fat prior to molding, enrobing, or depositing such that the finished, crystallized product will contain stable crystals and will not be susceptible to undesirable changes in mouthmelt characteristics or appearance under typical conditions of product distribution and handling.

As used herein, the term "dynamic tempering" means tempering accomplished with the use of physical force or energy in addition to the typical removal and addition of thermal energy during tempering of formulations containing polymorphic fats.

As used herein, the term "comprising" means various components or steps can be conjointly employed in the present invention. Accordingly, the term "comprising" encompasses the more restrictive terms "consisting essentially of" and "consisting of."

All percentages, ratios and proportions used herein are by weight unless otherwise specified.

B. Flavored Confectionery Compositions

1. Flavor Component

The flavored confectionery compositions useful in the improved process of the present invention comprise a flavor-enhancing amount of a flavor component. The flavor component comprises flavor constituents which impart positive flavor characteristics, and optionally nonflavor constituents normally present in flavor compositions, e.g. flavor carriers. As used herein, the term "flavor-enhancing amount" refers to an amount of the flavor component sufficient to impart positive flavor characteristics to the composition. As such, the amount of the flavor component sufficient to be "flavor enhancing" can depend on the flavor source used, the flavor effects desired and like factors. Typically, the flavor component (nonfat constituents) comprises from about 0.1 to about 25% of the composition.

A variety of flavor sources (e.g., fruit, yogurt and mint flavors) can be used to form the flavor component. A particularly preferred flavor source is a chocolate flavor. Suitable chocolate flavors can be derived from chocolate-liquor, cocoa powder, or blends thereof. These chocolate materials (fat plus nonfat ingredients)

are typically included at from about 5 to about 25% of the composition. As used herein, "chocolate-liquor" refers to the solid or semi-plastic food prepared by finely grinding cacao nibs. Chocolate-liquor usually contains from about 50 to about 58% cocoa butter fat. As used herein, "cocoa powder" refers to the residual material remaining after part of the cocoa butter fat has been removed from ground cacao nibs. Cocoa powder usually contains from about 10 to about 22% cocoa butter fat. Other sources of flavor include vanillin, ethyl vanillin, spices, coffee, brown sugar, etc., as well as mixtures of these flavors.

2. Fat Component

The flavored confectionery composition further comprises a fat component. As used herein, the term "fat component" refers to all triglycerides, diglycerides and monoglycerides present in the composition. For example, if chocolate-liquor is used to formulate chocolate-flavored compositions, the cocoa butter portion is included as part of the fat component. If milk solids are used, for example, in milk chocolate-flavored compositions, any milkfat present is included as part of the fat component.

The fat component comprises from about 15 to about 45% of the composition. The particular amount of the fat component which is suitable depends on the particular application in which the flavored confectionery composition is used. For molding applications (e.g., chocolate-flavored bars), the fat component preferably comprises from about 28 to about 36% of the composition. For enrobing applications (e.g., enrobed candy bars or cookies), the fat component preferably comprises from about 28 to about 40% of the composition. For depositing applications (e.g. chocolate-flavored chips), the fat component preferably comprises from about 25 to about 35% of the composition.

a. Reduced Calorie Cocoa Butter Substitute Fat

The major constituent in this fat component is a reduced calorie cocoa butter substitute fat. By "reduced calorie" as used herein is meant fats that provide an at least about 10%, and preferably an at least about 30%, reduction in calories relative to corn oil. These reduced calorie fats usually provide between about 20% and about 50% reduction in calories. The reduction in calories provided by these reduced calorie fats can be determined by studies similar to that described by Peters, J. C. et al., *Journal of the American College of Toxicology*, Vol. 10, No. 3, 1991, pp. 357-367.

The particular amount of reduced calorie cocoa butter substitute fat present in the fat component depends upon the degree of calorie reduction desired and the particular mouthmelt, firmness and tempering properties desired for the flavored confectionery composition. These reduced calorie fats comprise at least about 70% of the fat component. Preferably, these reduced calorie fats comprise at least about 75% of the fat component, more preferably at least about 80%, and most preferably at least about 85% of the fat component.

Reduced calorie cocoa butter substitute fats useful in the fat component are characterized by particular levels of triglycerides selected from MLM, MML, LLM, LML, and MMM triglycerides, wherein M is a medium chain $C_6$ to $C_{10}$ saturated fatty acid residue and L is a long chain $C_{20}$ to $C_{24}$ saturated fatty acid residue. See U.S. application entitled "Reduced Calorie Fats Made from Triglycerides Containing Medium and Long Chain Fatty Acids," to Paul Seiden, Ser. No. 329,620 (P&G Case 3760R), filed Mar. 28, 1989 (herein incorporated by reference), which discloses reduced calorie fats useful in the fat component, and especially Examples 1 and 2 for methods for making same.

"MML" represents a triglyceride containing a long chain saturated acid residue in the #1 or #3 position (an end position) with two medium chain saturated fatty acid residues in the remaining two positions, while "MLM" represents a triglyceride with a long chain fatty acid residue in the #2 position (the middle position) and two medium chain fatty acid residues in the #1 and #3 positions. (These MLM and MML triglycerides have carbon numbers predominantly in the range of from $C_{38}$ to $C_{42}$). Similarly, "LLM" represents a triglyceride with a medium chain fatty acid residue in the #1 or #3 position and two long chain fatty acid residues in the remaining two positions, while "LML" represents a triglyceride with a medium chain fatty acid residue in the #2 position and two long chain fatty acid residues in the #1 and #3 positions. (These LLM and LML triglycerides have carbon numbers predominantly in the range Of $C_{52}$ to $C_{54}$.)

"MMM" represents a triglyceride containing medium chain saturated fatty acid residues at all three positions. (These MMM triglycerides have carbon numbers predominantly in the range of $C_{24}$ to $C_{30}$.) Similarly, "LLL" represents a triglyceride containing long chain saturated fatty acid residues at all three positions. (These LLL triglycerides have predominantly a carbon number of $C_{66}$.) Any triglycerides (including LLL triglycerides) other than MLM, MML, LLM, LML, and MMM triglycerides are referred to herein as "other triglycerides."

To provide desirable mouthmelt characteristics in the resulting tempered confectionery products, the level of mono-long chain (MLM and MML) triglycerides is preferably maximized in these reduced calorie cocoa butter substitute fats. In addition, to avoid undesirable softness (i.e., lack of "snap") in the resulting tempered confectionery products, the level of tri-medium chain (MMM) and di-long chain (LLM/LML) triglycerides in these reduced calorie fats is preferably minimized. Within these guidelines, reduced calorie fats useful in the fat component can comprise: (1) at least about 85%, preferably at least about 90% and most preferably at least about 94% combined MLM and MML triglycerides; (2) no more than about 10%, preferably no more than about 6%, and most preferably no more than about 2% combined LLM and LML triglycerides; (3) no more than about 4%, preferably no more than about 3%, and most preferably no more than about 2% MMM triglycerides; and (4) no more than about 10%, preferably no more than about 7%, and most preferably no more than about 5% other triglycerides.

The reduced calorie cocoa butter substitute fats useful in the fat component are further characterized by a particular fatty acid composition. One important aspect of this fatty acid composition is the total amount of medium chain $C_8$ and $C_{10}$ saturated fatty acids (i.e., caprylic and capric acids). These medium chain fatty acids generally control the melting point of the respective triglyceride mixture. In addition, these medium chain fatty acids are readily hydrolyzed (especially if attached at the #1 or #3 positions) by pancreatic lipase and then absorbed to provide a rapid energy source. However, these medium chain fatty acids, when metabolized, provide less total calories than longer chain fatty acids.

The fatty acid composition of these reduced calorie cocoa butter substitute fats can comprise from about 35 to about 60%, preferably from about 40 to about 60%, and most preferably from about 45 to about 55% combined $C_8$ and $C_{10}$ saturated fatty acids. However, due to the sources of $C_8/C_{10}$ saturated fatty acids typically used to synthesize these reduced calorie fats, a minor amount of $C_6$ saturated fatty acid (i.e., caproic acid) can be present. Preferably, these reduced calorie fats contain no more than about 10%, and most preferably no more than about 5% $C_6$ saturated fatty acid.

In addition to the combined percentage of these medium chain fatty acids, the particular ratio of $C_8$ to $C_{10}$ saturated fatty acids is important in controlling the melting point, as well as the tempering properties, of these reduced calorie cocoa butter substitute fats. For example, higher amounts of $C_8$ saturated fatty acid lower the melting point of the reduced calorie fat and thus make the resulting tempered confectionery product softer. Conversely, higher amounts of $C_{10}$ saturated fatty acid raise the melting point of the reduced calorie fat and impart a greater degree of firmness to the resulting tempered confectionery product. Within these guidelines, reduced calorie cocoa butter substitute fats useful in the fat component can have a ratio of $C_8$ to $C_{10}$ saturated fatty acids of from about 1:5 to about 25:1, preferably from about 1:3 to about 19:1, and most preferably from about 1:2 to about 2:1.

The other important aspect of the fatty acid composition of these reduced calorie cocoa butter substitute fats is the amount of $C_{22}$ saturated fatty acid (i.e., behenic acid). Behenic fatty acid, when hydrolyzed from the respective triglyceride, is solid at body temperature, i.e. 98.6° F. (37° C.). Accordingly, the hydrolyzed behenic fatty acid is much more poorly absorbed compared to the medium chain saturated fatty acids and other long chain saturated and unsaturated fatty acids.

These reduced calorie cocoa butter substitute fats can comprise from about 35 to about 60%, preferably from about 40 to about 60%, and most preferably from about 40 to about 50% behenic fatty acid. Due to the sources of behenic fatty acid typically used to synthesize these reduced calorie fats, minor amounts of long chain $C_{20}$ or $C_{24}$ saturated fatty acids can be present. Preferably, these reduced calorie fats comprise no more than about 10% $C_{20}$ saturated fatty acid and no more than about 4% $C_{24}$ saturated fatty acid, and most preferably no more than about 6% $C_{20}$ saturated fatty acid and no more than about 2% $C_{24}$ saturated fatty acid.

The reduced calorie cocoa butter substitute fats can also contain minor amounts of other fatty acids. For example, small amounts of $C_{12}$ to $C_{18}$ saturated fatty acids (e.g., lauric, myristic, palmitic and stearic acids), as well as $C_{18}$ unsaturated fatty acids (e.g., oleic, linoleic and linolenic acids), can be present in the reduced calorie fats, typically due to the sources of fatty acids used in synthesis. These fatty acids can affect the calorie reduction benefits, as well as the mouthmelt, firmness and tempering properties, of these reduced calorie fats. Accordingly, these reduced calorie fats usually comprise no more than about 9%, preferably no more than about 5%, and most preferably no more than about 3% of these other fatty acids.

Preferred and most preferred carbon number profiles (CNP) for these reduced calorie cocoa butter substitute fats are as follows:

| CNP | PREFERRED (%) | MOST PREFERRED (%) |
| --- | --- | --- |
| 32 or lower | <3 | <1 |
| 34 | <2 | <1 |
| 36 | <5 | <3 |
| 38 | 15-95 | 20-85 |
| 40 | 0-60 | 0-55 |
| 42 | 5-85 | 15-75 |
| 44 | <3 | <2 |
| 46 | <1 | <0.6 |
| 48 | <0.8 | <0.6 |
| 50 | <0.6 | <0.5 |
| 52 | <0.4 | <0.3 |
| 54 or higher | <0.9 | <0.4 |

These reduced calorie cocoa butter substitute fats can be synthesized by a wide variety of techniques such as:
(a) random rearrangement of tribehenin and medium chain triglycerides having $C_8/C_{10}$ saturated fatty acids;
(b) esterification of glycerol with a blend of the corresponding fatty acids;
(c) transesterification of a blend of $C_8/C_{10}$ saturated fatty acid methyl esters and behenic fatty acid methyl esters with glycerol;
(d) transesterification of glyceryl behenate with medium chain triglycerides having $C_8/C_{10}$ saturated fatty acids; and
(e) esterification of monobehenin with $C_8/C_{10}$ saturated fatty acids or the respective anhydrides. See U.S. Pat. No. 5,142,071 to Bernard W. Kluesener, Gordon K. Stipp and David K. Yang, issued Aug. 25, 1992, entitled "Selective Esterification of Long Chain Fatty Acid Monoglycerides with Medium Chain Fatty Acids," especially Example 1; and U.S. Pat. No. 5,142,072 to Gordon K. Stipp and Bernard W. Kluesener, issued Aug. 25, 1992, entitled "Selective Esterification of Long Chain Fatty Acid Monoglycerides with Medium Chain Fatty Acid Anhydrides," especially Example 7 (herein incorporated by reference).

Random rearrangement of triglycerides is well known in the art, as is the esterification of glycerol with fatty acids. For discussions on these subjects, see Hamilton et al., *Fats and Oils: Chemistry and Technology*, pp. 93-96, Applied Science Publishers Ltd., London (1980), and Swern, *Bailey's Industrial Oil and Fat Products*, 3d ed., pp. 941-943 and 963-965 John Wiley and Sons, New York, (1964), which are incorporated by reference. Transesterification is also discussed generally in Bailey's at pp. 958-963.

Fatty acids per se or naturally occurring fats and oils can serve as sources of fatty acids for preparing these reduced calorie cocoa butter substitute fats. For example, hydrogenated high erucic acid rapeseed oil is a good source of behenic acid. Medium chain $C_8/C_{10}$ saturated fatty acids can be obtained from coconut, palm kernel, or babassu oils. They can also be obtained from commercial medium chain triglycerides, such as the Captex 300 brand sold by Capital City Products, of Columbus, Ohio.

Tribehenin, useful for making the present reduced calorie triglycerides, can be prepared from behenic acid or from fractionated methyl behenate by esterification of the acid, or by transesterification of methyl behenate with glycerol. More importantly, blends of behenic acid and medium chain $C_8/C_{10}$ saturated fatty acids can be esterified with glycerol. Similarly, methyl ester blends can also be interesterified with glycerol.

The crude triglyceride mixture resulting from synthesis is typically modified by additional fractionation to provide higher levels of monolong chain MLM and MML triglycerides in these reduced calorie cocoa butter substitute fats. Solvent and non-solvent crystal fractionation or fractional distillation methods (e.g. molecular distillation as described below) can be used. Standard fractionation methods are discussed in Applewhite, *Bailey's Industrial Oil and Fat Products*, Vol. 3, 4th ed. (1985), pp. 1-39, John Wiley & Sons, New York, which is incorporated by reference. Molecular distillation can separate MML/MLM from LLM/LML triglycerides, and can shift the carbon number concentration, but it cannot fractionate triglycerides having the same carbon number. Non-solvent or solvent crystal fractionation can also fractionate MLM/MML triglycerides from the higher melting LLM/LML triglycerides. The molecular distillation or crystal fractionation of the crude triglyceride mixture is usually repeated several times to increase the level of desired MLM/MML triglycerides in these reduced calorie fats.

Fractional distillation of the crude triglyceride mixture is not limited to molecular distillation, but can also include conventional distillation (continuous or batch). After synthesis of the crude triglyceride mixture, it is common to use a conventional batch distillation technique to remove most of the excess medium chain triglycerides, and then continue with molecular distillation. The vacuum requirements are not as strict, and the temperature used can be higher in conventional distillation versus molecular distillation. The conventional distillation temperature is generally between 405° F. (207° C.) and 515° F. (268° C.). The absolute pressure is less than 8 mm Hg, more preferably less than 2 mm Hg. The distillation is aided by sparging with steam, nitrogen or other inert gas (e.g., $CO_2$). The distillation is carried out to remove part of the excess medium chain triglycerides, most of the excess medium chain triglycerides, or to distill also the monolong chain (MLM and MML) components.

Crystal fractionation of the distilled triglyceride mixture can be carried out with and without solvents, with and without agitation. The crystal fractionation can be repeated several times. Crystal fractionation is particularly effective to remove high melters. Fractionation of the distilled triglyceride mixture without solvents can be used to remove LLM and LML components (predominantly carbon numbers $C_{52}$ and $C_{54}$), which in turn alters the melting profile of these reduced calorie fats.

b. Milkfat and Cocoa Butter

The fat component can tolerate up to certain levels of milkfat and cocoa butter. Milkfat (sometimes referred to as "butterfat") is usually present in the fat component as the result of the inclusion of milk solids in milk chocolate-flavored confectionery compositions. However, milkfat can also be present as the result of the inclusion of butter oil. Milkfat can generally be tolerated in the fat component at levels up to about 20%. For milk chocolate-flavored compositions, as well as pastel coatings (e.g., mint-flavored confectionery coating compositions) that optionally contain cocoa butter, milkfat is preferably present in the fat component at a level up to about 14%.

The cocoa butter present in the fat component can be included as an added fat. However, cocoa butter is more typically included as a result of its being present in the source of chocolate flavoring (e.g., cocoa powder, chocolate liquor, or more typically blends thereof) used in the flavored confectionery composition. Cocoa butter can generally be tolerated in the fat component at levels up to about 20%. For chocolate-flavored confectionery compositions, cocoa butter is preferably present in the fat component at a level up to about 14%.

c. Diglycer her Confectionery Fats

Besides the triglyceride composition of the fat component, the particular level of diglycerides present can also have an important effect on the fat crystallization properties of the flavored confectionery composition. The reduced calorie cocoa butter substitute fat typically contributes most, if not all, of the diglycerides present in the fat component. However, other fats present in the fat component can also contribute a certain portion of diglycerides. For bloom resistance, it is particularly important to minimize the level of diglycerides in the fat component. Up to about 4% diglycerides can be tolerated in the fat component. Preferably, the level of diglycerides in the fat component is no more than about 2%, and most preferably no more than about 1%.

In addition to the reduced calorie cocoa butter substitute fat, milkfat, and cocoa butter, the fat component of the present invention can comprise other compatible confectionery fats. These compatible confectionery fats include cocoa butter substitutes derived from illipe butter (Borneo tallow), Shea butter, Mowrah fat and palm oil. Suitable cocoa butter substitutes derived from palm oil are the POP fats disclosed in Baker et al U.S. Pat. No. 4,594,259, issued Jun. 10, 1986, which is incorporated by reference. These other cocoa butter substitute fats can be included as partial or total replacements for the cocoa butter present in the fat component. However, because of their higher caloric value, these other cocoa butter substitute fats are typically not included in the fat component.

3. Other Confectionery Ingredients a. Sugars, Sugar Alcohols, and Reduced Calorie Sweeteners

One particularly important nonfat ingredient in these flavored confectionery compositions is sugar. Sugar is typically present in such compositions at from about 35 to about 60%, and preferably at from about 40 to about 55%, of the composition. Especially for chocolate-flavored confectionery compositions, the source of sugar needs to be essentially dry. Sources of sugar include sucrose, fructose, glucose, maltose and mixtures thereof. The sugar typically has a particle size in the range of from about 0.0002 to about 0.0016 inches (from about 5 to about 40 microns) in the finished chocolate-flavored product.

For dietary reasons, the sugar can be completely or partially substituted with a sugar alcohol. Suitable sugar alcohols include sorbitol, xylitol, mannitol and mixtures thereof. For further calorie reduction, the sugar or sugar alcohol can be completely or partially substituted with a reduced calorie sweetener. These reduced calorie sweeteners include, but are not limited to, aspartame, saccharin, alitame, thaumatin, dihydrochalcones, cyclamates, steviosides, glycyrrhizins, synthetic alkoxy aromatics, such as Dulcin and P-4000, sucrolose, suosan, miraculin, monellin, talin, cyclohexylsulfamates, substituted imidazolines, synthetic sulfamic acids such as acesulfame, acesulfam-K and n-substituted sulfamic acids, oximes such as perilartine, rebaudioside-A, peptides such as aspartyl malonates and succanilic acids, dipeptides, amino acid based sweeteners such as gem-diaminoalkanes, meta-aminobenzoic acid, L-aminodicarboxylic acid alkanes, and amides of certain alphaaminodicarboxylic acids and gem-diamines, and 3-hydroxy-4-alkyloxyphenyl aliphatic carboxylates or heterocyclic aromatic carboxylates. When these reduced calorie sweeteners are used, it can be desirable to include bulking or bodying agents. Suitable bulking agents include partially digestible and nondigestible carbohydrates, for example, polydextrose, isomalt, inulin and inulo-oligosaccharides, fructooligosaccharides, L-sugars and D-tagatose.

b. Milk solids

Especially in milk chocolate-flavored compositions and pastel coatings, the flavored confectionery composition can also include up to about 20% milk solids (essentially dry), usually at from about 9 to about 20% of the composition, and typically at from about 12 to about 18%. Suitable sources of essentially dry milk solids can be obtained from cream, milk, concentrated milk, sweetened condensed milk, skim milk, sweetened condensed skim milk, concentrated buttermilk, and the like. (As previously stated, any fat present in the milk solids, such as milkfat, is considered part of the fat component.)

c. Emulsifiers and Other Minor Ingredients

Flavored confectionery compositions usually include an emulsifier to "wet" the sugar particles with the fat component. Suitable emulsifiers include sorbitan monostearate, sorbitan tristearate, polysorbate 60, polyglycerol esters, sucrose partial esters, ammonium phosphatides, phosphate salts of mono- and diglycerides, and particularly lecithin. These emulsifiers are usually present at up to about 1.5% of the composition, and typically at up to about 0.5%. Preferred levels of emulsifier are from about 0.05 to about 0.5%. Other minor ingredients such as salt normally present in fat-based confections can be included, as well as optional components, such as the pharmaceutical actives disclosed at column 7, lines 1–35 of Chapura et al U.S. Pat. No. 4,786,502, issued Nov. 22, 1988, which is incorporated by reference.

C. Preparation of Flavored Confectionery Compositions

The above flavored confectionery compositions containing the above components are prepared according to the improved process of the present invention. The following discussion of this improved process will generally be with regard to chocolate-flavored confectionery products, which are highly preferred products prepared according to the present invention. However, this improved process can also be used to prepare non-chocolate-flavored confectionery products (e.g. pastel coatings) by using the same or similar steps.

1. Formulation of Ingredients

Initially, a chocolate-flavored confectionery mixture is formulated. Some typical chocolate formulations include milk chocolate-flavored compositions, and dark chocolate-flavored compositions. In addition to the reduced calorie fat, milk chocolate-flavored compositions typically comprise sugar, cocoa powder, optionally chocolate liquor, milk solids, lecithin as the emulsifier, and other confectionery ingredients such as vanillin and salt. Dark chocolate-flavored compositions are similar to milk chocolate-flavored compositions but typically do not include milk solids.

The total fat present in these chocolate-flavored formulations can be adjusted to provide the desired viscosity. For molding or depositing applications, the amount of total fat is preferably lower. For enrobing applications, the amount of total fat is preferably higher. The ratios of sugar, cocoa powder, chocolate liquor, and milk solids can vary depending upon the flavor desired.

The chocolate-flavored formulations are prepared by mixing the ingredients to "wet" them with the reduced calorie fat and to provide a consistency suitable for the subsequent refining step. During this mixing step, sugar, milk solids, salt, cocoa powder and optionally a portion of the total lecithin are added to a mixer. Then, the melted chocolate-liquor (if any) and a portion of the reduced calorie fat are added to the mixer. These ingredients are stirred for a period of time sufficient to "wet" the dry ingredients with the fat. The particular time period is not critical and is typically about 15 minutes. During this mixing step, the contents of the mixer are heated to a temperature at least such that the mass becomes fluid, typically from about 100° F. to about 125° F. (from about 37.8° C. to about 51.7° C.). Contact with moisture is avoided during this step. The consistency of the chocolate formulation after mixing is typically that of soft putty.

2. Refining Formulation

After mixing, the chocolate-flavored formulation is typically refined (milled) to reduce the solids, in particular the sugar, to the desired particle size, typically in the range of from about 0.0002 to about 0.0016 inches (5 to 40 microns). This refining step also coats the solids with the fat. Typically, three, four or five water-cooled rolls, each progressively faster in speed, are used to refine the formulation. Pressure between the rolls is adjusted to achieve the desired fineness for the solids. As in the dry mixing step, contact with moisture is avoided during refining. In particular, the rolls are not cooled to or below the dewpoint of ambient air. The consistency of the chocolate-flavored formulation after refining is typically that of flakes.

3. Conching Refined Formulation

After refining, the chocolate-flavored formulation is dry-conched to remelt and redistribute the fat on the surface of the solids in the refined mix. The moisture content of the mix is reduced to about 1% or less. Certain volatile compounds are also removed which improves the flavor. In this dry conching step, flakes from the refining step are first broken into a powdery mass in a mixer which is typically heated to at least about 125° F. (51.7° C.). When this temperature is reached, the mass has the consistency of lumps of firm putty. The contents of the mixer can be adjusted to temperatures in the range of from about 100° to about 160° F. (37.8° to 71.1° C.) for milk chocolate-flavored formulations and to temperatures in the range of from about 120° to about 180° F. (48.9° to 82.2° C.) for dark chocolate-flavored formulations. The total time required for this dry-conching step can typically range from about 1 to about 10 hours.

After dry-conching, the chocolate-flavored formulation is wet-conched. During wet-conching, the remaining portion of the reduced calorie fat and optionally lecithin are added and then mixed to provide a viscous fluid mass. The contents of the mixer can be adjusted to temperatures in the range of from about 100° to about 160° F. (37.8° to 71.1° C.), the particular temperature depending upon the particular chocolate-flavored formulation. The total time required for this wet-conching step can typically range from about 2 to about 20 hours. After this wet-conching step, additional lecithin can be added to adjust the viscosity of the mass to that required for the intended application. Mixing is continued, typically for about 10 to about 60 minutes.

4. Tempering Conched Formulation

The key aspect of the improved process of the present invention is the dynamic tempering of the reduced calorie flavored confectionery composition. The benefits of dynamic tempering can be obtained by tempering the composition after, for example, the conching step. During tempering, a portion of the fat is precrystallized such that the finished, crystallized product will contain stable crystals and will not be susceptible to undesirable changes in mouthmelt characteristics or appearance under typical conditions of product distribution and handling.

Dynamic tempering of the flavored confectionery products herein is brought about by first rapidly cooling and then conditioning such a composition while working the composition to impart shear agitation thereto. Thus, in a first step of such a dynamic tempering procedure, a confectionery composition of the type hereinbefore described, with its fat component in a non-crystalline state—for example, conched chocolate compositions at a temperature from about 100° F. to about 160° F. (37.8° C. to 71.1° C.)—can be quickly cooled to a temperature of less than about 70° F. (21.1° C.) in tempering equipment which imparts shear agitation to the composition therein. Such cooling generally occurs at a rate of from 0.8° F./min. to about 150° F./min. (0.4° C./min. to 83° C./min.), more preferably at a rate of from about 1.5° F./min. to about 100° F./min. (0.8° C./min. to 56° C./min.). Preferably the compositions are cooled during this procedure to a temperature within the range of from about 55° F. to about 70° F. (12.8° C. to 21.1° C.). During the cooling procedure, shear agitation is imparted to the composition to the extent of shear rates ranging from about 400 to about 8000 sec$^{-1}$, more preferably from about 500 to about 6000 sec$^{-1}$.

Typically, the cooling step of the dynamic tempering procedure is carried out in a conventional swept-wall chocolate tempering unit or equivalent equipment as hereinafter more fully described. The temperature of the coolant used for this cooling operation in this equipment is less than the final temperature of the chocolate-flavored composition. Typically the coolant temperature is in the range of from about −10° to about 65° F. (−23.3° to 18.3° C.). More preferably, the coolant temperature is in the range of from about 20° to about 45° F. (−6.7° to 7.2° C.). Also typically, the residence time of the chocolate-flavored composition in the swept-wall chocolate tempering unit is less than about 20 minutes. Preferably the residence time in the tempering unit is in the range of from about 4 to about 25 minutes.

In a second stage of the dynamic tempering procedure used in this invention, the cooled confectionery composition is conditioned under shear agitation at a warmer temperature of from about 70° F. to about 85° F. (21.1° C. to 29.4° C.). More preferably, the composition is conditioned at a temperature of from about 70° F. to about 78° F. (21.1° C. to 25.6° C.). Generally the conditioning step lasts for at least about 5 minutes, more preferably for at least about 30 minutes.

As in the cooling step, the conditioning step of the dynamic tempering procedure herein is carried out with the confectionery composition maintained under agitation. Generally, however, less shear agitation is needed during the conditioning step in comparison with that utilized during the cooling (nucleation) step. Thus, generally during the conditioning operation, shear agitation can be imparted to the confectionery composition to the extent of shear rates ranging from about 10 to about 8000 sec$^{-1}$. Suitable equipment for carrying out the conditioning step of the dynamic tempering procedure is described more fully hereinafter, along with the equipment useful for carrying out the cooling step.

Various types of conventional apparatus may be used to carry out the two stages of the dynamic tempering operation employed in the process of this invention. Any apparatus or equipment can be used which has the capability to quickly cool flavored confectionery composition to form low-melting crystal nuclei and the capability to thereafter condition the crystal nuclei formed to at least partially transform these low-melting crystal nuclei to the β-3 form. Such tempering apparatus also serves to impart the requisite amount of shear agitation to the cooled/conditioned compositions which are processed therein.

The initial cooling of the flavored confection compositions can be carried out in any swept-wall, scraped-wall, or screw-type heat exchanger that is suitable for transferring the requisite amounts of thermal and mechanical energy. Examples of such heat exchangers include Votator and Girdler "A" units and a Groen Model #DR(C) used for margarine and shortening manufacture and Aasted chocolate tempering units. References to these conventional units include: Greenwell, B. A., *J. Amer. Oil Chem. Soc.*, March 1981, pp. 206–7; Haighton, A. J., *J. Amer. Oil Chem. Soc.*, 1976, Vol. 53, pp. 397–9; Wiedermann, L. H. *J. Amer. Oil Chem. Soc.*, Vol. 55, pp. 826–7; Beckett, S. T., editor, *Industrial Chocolate Manufacture and Use*, Van Nostrand Reinhold, New York, 1988, pp. 185–9. All of these publications are incorporated herein by reference.

A preferred piece of equipment for carrying out the cooling step of the dynamic tempering operation is a swept-wall chocolate tempering machine, such as a Sollich Turbo Temperer. Devices of this general type, as well as components thereof, are described more fully in Sollich U.S. Pat. No. 4,059,047, issued Nov. 22, 1977; Sollich U.S. Pat. No. 4,178,105, issued Dec. 11, 1979; Blum U.S. Pat. No. 4,648,315, issued Mar. 10, 1987; and Sollich U.S. Pat. No. 4,859,483, issued Aug. 22, 1989. All of these patents are incorporated herein by reference.

Preferred types of apparatus for carrying out the conditioning step of the dynamic tempering operation herein include any agitated, jacketed vessel capable of being operated such that air can be excluded from incorporation into the flavored confectionery composition being processed therein and the temperature of the composition can be suitably controlled. An example of a suitable scraped-wall, jacketed, open tank mixer is a Krueter temper kettle (Beckett, pp. 183–4). In addition, a "picker box" can be used for the conditioning step of the tempering operation. A picker box is also referred to as a Votator or Girdler "B" unit and is used extensively in the margarine and shortening industries. There are many references to this type of equipment, including Joyner, N. T., *J. Amer. Oil Chem. Soc.*, 1953, vol. 30, pp.526–535 and Schwitzer, M. K., *Margarine and Other Food Fats,* Interscience Publishers, New York, 1956, p. 287. These publications are also incorporated herein by reference.

For the conditioning operation, an agitated, jacketed vessel in the form of a picker box is preferably employed. In addition, it is possible to carry out the conditioning step in two or more separate pieces of agitated, heat exchanger equipment. For example, it is possible to start the warm-up in the top section of a scraped-wall or swept-wall chocolate tempering unit, e.g. the Sollich Turbo Temperer, and complete the conditioning in the picker box.

It is also possible to carry out both the cooling (nucleation) step and the conditioning step of the dynamic tempering procedure herein in a single piece of heat exchanger apparatus. For example, configuration of, conditions in and flow rates through a turbo temperer, e.g. a Sollich Turbo Tempering column, can be adjusted so that both the cooling and conditioning steps can take place within this device.

5. Setting Tempered Formulation

The dynamically tempered, fluid, chocolate-flavored mass is then ready for molding, extruding, depositing or enrobing applications. Molding, extruding and depositing applications include the formation of chocolate-flavored bars and chocolate chips, while enrobing applications include candy bars and cookies covered with a chocolate-flavored coating. In molded, deposited or extruded applications, the fluid chocolate-flavored mass is simply filled into the appropriate mold, deposited onto a flat surface such as a moving belt, or extruded into the desired configuration. In enrobing applications, the fluid chocolate-flavored mass is applied to the appropriate substrate such as a confectionery nougat center or cookie center using conventional enrobing equipment.

The tempered formulation is "set" or crystallized in a manner such that the reduced calorie cocoa butter substitute fat is transformed into a stable $\beta$-3 crystalline phase. The particular manner in which the formulation is set will depend upon the particular formulation involved and the particular finished product form desired. Generally, the formulation is set by cooling it in an environment having a temperature of about 70° F. (21.1° C.) or less, typically in the range of from about 38° to about 70° F. (3.3° to 21.1° C.), for at least about 15 minutes, typically in the range of from about 15 to about 270 minutes, demolded and wrapped or otherwise packaged, and then held in an environment having a temperature of at least about 60° F. (15.60° C.), typically in the range of from about 60° to about 70° F. (15.6° to 21.1° C.). For example, in the case of molded products, the formulation will contain from about 28% to about 36% fat component and after dynamic tempering and filling into molds will be cooled in an environment having a temperature of about 65° F. (18.3° C.) for about 240 minutes before demolding and packaging in an environment having a temperature of about 65° F. (18.3° C.). Preferably, the dynamically tempered formulation can be cooled in molds in an environment having a temperature of about 65° F. (18.3° C.) or about 70° F. (21.1° C.) for from about 15 to 100 minutes before demolding. In this case, however, additional cooling in an environment having a temperature of about 45° F. (7.2° C.) or less for from about 2 to 15 minutes may be necessary for easy demolding and glossy appearance of the pieces. The demolded pieces are then warmed under controlled relative humidity so as to prevent condensation on the pieces, and the pieces are then packaged in an environment having a temperature of about 65° F. (18.3° C.). In the case of enrobed products, the formulation will contain from about 28% to about 40% fat component and after dynamic tempering the formulation can be enrobed onto centers, and can then be cooled in an environment having a temperature of about 65° F. (18.3° C.) for about 45 minutes before packaging in an environment having a temperature of about 65° F. (18.3° C.). Alternatively, the enrobed pieces can be cooled in an environment having a temperature of about 60° F. (15.6° C.) for about 15 minutes before packaging in an environment having a temperature of about 65° F. (18.3° C.) or less and then holding in an environment having a temperature of about 60° to 65° F. (15.6° to 18.30° C.).

D. Analytical Methods

1. CNP/GC Method

The carbon number profile (CNP) of the triglycerides present in the reduced calorie cocoa butter substitute fat can be determined by programmed temperature-gas chromatography (GC) using a short fused silica column coated with methyl silicone for analysis and characterization of the composition by molecular weight. The triglycerides are separated according to their respective carbon numbers, wherein the carbon number defines the total number of carbon atoms on the combined fatty acid residues. The carbon atoms on the glycerol molecule are not counted. Glycerides with the same carbon number will elute as the same peak. For example, a triglyceride composed of three $C_{16}$ (palmitic) fatty acid residues will co-elute with triglycerides made up of one $C_{14}$ (myristic), one $C_{16}$ and one $C_{18}$ (stearic) fatty acid residue or with a triglyceride composed of two $C_{14}$ fatty acid residues and one $C_{20}$ (arachidic) fatty acid residue. See Ehrman et al. U.S. Pat. No. 4,888,196, issued Dec. 19, 1989, which is incorporated by reference.

2. Fatty Acid Composition

The fatty acid composition of the triglycerides present in the reduced calorie cocoa butter substitute fats can be measured by gas chromatography. First, fatty acid ethyl esters of the triglycerides are prepared by any standard method (e.g., by transesterification using sodium ethoxide), and then separated on a capillary column which is coated with DB-WAX stationary phase. The fatty acid ethyl esters are separated by chain length and degree of unsaturation. A Split injection is made with flame ionization detection. Quantitation is performed by use of a double internal standard method. This method can separate fatty acid ethyl esters from $C_6$ to $C_{24}$. See Ehrman et al. U.S. Pat. No. 4,888,196, issued Dec. 19, 1989, which is incorporated by reference.

E. Specific Examples of the Improved Process According to Present Invention

The following are specific illustrations of the improved process in accordance with the present invention:

EXAMPLE 1

A reduced calorie flavored confectionary composition is prepared using the following ingredients:

| | Ingredients |
|---|---|
| chocolate liquor (52% cocoa butter) | 0.33 parts |
| cocoa powder (11% cocoa butter) | 7.64 parts |
| whole fat milk solids (26% butterfat) | 3.56 parts |
| nonfat milk solids (0.8% butterfat) | 8.92 parts |
| ethyl vanillin | 0.06 parts |
| soy lecithin | 0.44 parts |
| reduced calorie confectionery fat | 33.69 parts |
| sucrose | 55.56 parts |

The reduced calorie confectionery fat ingredient is prepared by esterifying monobehenin with caprylic and capric fatty acids according to the process described in U.S. Ser. No. 452,877, filed Dec. 19, 1989. This reduced calorie fat has the following triglyceride and fatty acid composition:

| | % |
|---|---|
| Triglycerides* | |
| $C_{24}$–$C_{30}$ | 0.2 |
| $C_{32}$–$C_{34}$ | 0.7 |
| $C_{36}$–$C_{44}$ | 98.3 |
| >$C_{44}$ | 0.7 |
| FAC** | |
| $C_{8:0}/C_{10:0}$ | 49.9 |
| $C_{12:0}/C_{14:0}/C_{16:0}$ | 0.3 |
| $C_{18:0}/C_{18:1}/C_{18:2}$ | 0.5 |
| $C_{20:0}$ | 1.2 |
| $C_{22:0}$ | 47.0 |
| $C_{22:1}$ | 0.1 |
| $C_{24:0}$ | 0.8 |

*by CNP, $C_{24}$–$C_{30}$ = MMM; $C_{32}$–$C_{34}$ = MML/MLM/other
$C_{36}$–$C_{44}$ = MML/MLM, >$C_{44}$ = LLM/LML/other
**Fatty Acid Composition To make a reduced calorie flavored confectionery composition from the above ingredients
1. Mix the dry ingredients (cocoa powder, whole milk solids, nonfat dry milk solids, ethyl vanillin, sucrose) at low speed.
2. Add melted chocolate liquor to the dry ingredients. Continue to mix at low speed.
3. Add 25.91 parts of the reduced calorie confectionery fat (previously melted) to the mixture. Continue mixing at the low speed until all of the ingredients are well blended.
4. Refine the mixture with a roll-mill.
5. Weight out 91.78 parts of the amount of mix recovered from the mill. Dry-conch at 140°–145° F. (60°–62.8° C.) for 2.5 to 3 hours at medium speed.
6. Add 7.78 parts of melted reduced calorie confectionery fat to the dry-conched mix. Add the soy lecithin. Mix well. Reduce the temperature to 120°–125° F. (48.9°–51.7° C. Reduce the mixer speed to low and continue wet-conching overnight (16 to 20 hours).

With these ingredients and procedure, a reduced calorie flavored confectionery composition with the following composition is prepared:

| | Composition |
|---|---|
| chocolate liquor (52% cocoa butter) | 0.30% |
| cocoa powder (11% cocoa butter) | 6.88% |
| whole fat milk solids (26% butterfat) | 3.20% |
| nonfat milk solids (0.8% butterfat) | 8.03% |
| ethyl vanillin | 0.05% |
| soy lecithin | 0.44% |
| reduced calorie confectionery fat | 31.10% |
| sucrose | 50.00% |

A Sollich MSV200B tempering column consisting of a vertically arranged column of six swept-wall heat exchanger plates is used to cool the wet-conched reduced calorie confectionery composition from melt at 120° F. (48.9° C.) to about 60° F. (15.6° C.). The composition, flowing from the bottom to the top of the tempering column at the lowest flow rate possible to give a residence time of 25 minutes, is mixed at 50 rpm (maximum shear rate of about 4000 sec$^{-1}$) while being cooled at a rate of 2.4° F./min. (1.3° C./min.). The coolant temperatures are 120° F. (48.9° C.) on the first two heat exchanger plates, −3° F. (−19.4° C.) on the next heat exchanger plate and 56° F. (13.3° C.) on the remaining three heat exchanger plates. Within the Sollich tempering column, low-melting fat crystal nuclei are formed in the reduced calorie flavored confectionery composition.

The reduced calorie flavored confectionery composition exits the Sollich at a high viscosity and enters an agitated B unit, 16 inches long with a 5 inch inner diameter, where it mixes at 180 rpm (average shear rate of about 40 sec$^{-1}$) for three hours at a warmer product temperature of about 70°–75° F. (21.1°–23.9° C.). The B unit jacket is cooled with water circulating at 51° F. (10.6° C.), to remove part of the friction heat from the mixing and heat of transformation to β-3. Within the B unit, the low-melting crystals transform to β-3. After mixing, the reduced calorie flavored confectionery composition exits at a viscosity that can easily be handled for molding or enrobing applications.

For molding, samples in molds are cooled for 90 minutes at 65° F. (18.3° C.) or 70° F. (21.1° C.) under a fan (run at about 2 m/s) and then are further cooled for 15 minutes at 45° F. (7.2° C.) under a fan (run at about 2 m/s), demolded manually, and packed at 65° F. (18.3° C.) while retaining good gloss. For enrobing, coated centers are cooled for 45 minutes at 65° F. (18.3° C.) or for 16 minutes at 60° F. (15.6° C.) under a fan (run at about 2 m/s) and then are hard enough to pack at 65° F. (18.3° C.). All of the reduced calorie flavored confectionery compositions are bloom free after dynamic tempering and will not bloom after exposure to 90° F. (32.2° C.) for 90 minutes or after five 24-hour cycles of 86° F. (30.0° C.) for 8 hours and 70° F. (21.1° C.) for 16 hours.

EXAMPLE 2

Using a reduced calorie flavored confectionery composition prepared as described in Example 1, the Sollich is run at a faster flow rate, giving a much lower residence time of 4 minutes.

The wet conched reduced calorie flavored confectionery composition is cooled from melt at 120° F. (48.9° C.) to about 70° F. (21.1° C.) at a rate of 12.5° F./min. (6.9° C./min.) in the Sollich tempering column mixing at 50 rpm (maximum shear rate of about 4000 sec$^{-1}$). To lower the reduced calorie flavored confectionery composition temperature, all six plates in the column are cooled with water circulating at 66° F. (18.9° C.). The reduced calorie flavored confectionery composition exiting the Sollich has a very low viscosity.

The bulk of the crystal formation occurs in the subsequent mixing step where the reduced calorie flavored confectionery composition mixes for four hours in an agitated B unit. In the B unit, the reduced calorie flavored confectionery composition bulk temperature stays relatively constant at about 75° F. (23.9° C.) even though the mixer is cooled with water circulating at 60° F. (15.6° C.) to remove part of the heat that is produced via mixing at 180 rpm (average shear rate of about 40 sec$^{-1}$) and crystallization. The reduced calorie flavored confectionery composition is then molded and enrobed at a typical viscosity.

After cooling for 90 minutes at 65° F. (18.3° C.) or 70° F. (21.1° C.) under a fan (run at about 2 m/s), samples in molds are further cooled for 15 minutes at 45° F. (7.2° C.) under a fan (run at about 2 m/s), demolded manually, and packed at 65° F. (18.3° C.) while retaining good gloss. After cooling for 45 minutes at 65° F. (18.3° C.) or for 15 minutes at 60° F. (15.6° C.) under a fan (run at about 2 M/s), enrobed centers are hard enough to pack 65° F. (18.3° C.). All of the reduced calorie flavored confectionery compositions are bloom free after dynamic tempering and will pass both thermal stress tests mentioned in Example 1.

EXAMPLE 3

A reduced calorie flavored confectionery composition is made according to the formulation and procedure described in Example 1.

From melt at 120° F. (48.9° C.) the reduced calorie flavored confectionery composition is cooled to about 66° F. (18.9° C.), at a rate of 3.6° F./min. (2.0° C./min.) in the Sollich tempering column. Operating with a total 18 minute residence time and at 70 rpm (maximum shear rate of about 5600 sec$^{-1}$), the column cools the reduced calorie flavored confectionery composition to 66° F. (18.9° C.) with the first two plates chilled with 75° F. (23.9° C.) water followed by three plates jacketed at 40° F. (4.4° C.). The final plate slightly warms the reduced calorie flavored confectionery composition to about 70° F. (21.1° C.) using 80° F. (26.7° C.) water within the water jacket. The reduced calorie flavored confectionery composition exits the Sollich at a high viscosity.

After processing at 180 rpms (average shear rate of about 40 sec$^{-1}$) in an agitated B unit jacketed at 66° F. (18.9° C.) for 9 minutes, the reduced calorie flavored confectionery composition has a temperature of 75° F. (23.9° C.) and is reduced in viscosity. After cooling for 90 minutes in molds at 65° F. (18.3° C.) under a fan (run at about 2 m/s), the reduced calorie flavored confectionery composition transforms enough to its stable β-3 phase to be demolded manually after 15 minutes of cooling at 45° F. (7.2° C.) under a fan (run at about 2 m/s) with good gloss. After cooling for 45 minutes at 65° F. (18.3° C.) or for 15 minutes at 60° F. (15.6° C.) under a fan (run at about 2 m/s) the enrobed samples are hard enough to pack at 65° F. (18.3° C.). All samples are without bloom and will pass both thermal stress tests mentioned in Example 1.

EXAMPLE 4

A temperable reduced calorie flavored confectionery composition is made according to the general formulation and procedure described in Example 1.

From melt at 120° F. (48.9° C.) the reduced calorie flavored confectionery composition is then cooled by a series of six swept wall heat exchanger plates (the Sollich Turbo temperer). Operating with an 18 minutes residence time and at 50 rpm (maximum shear rate of about 4000 sec$^{-1}$), the Sollich Turbo tempering column cools the reduced calorie flavored confectionery composition at a rate of 10.8° F./min. (6.0° C./min.) to 55° F. (12.8° C.) in the first two plates chilled with 20° F. (−6.7° C.) water. In the next four plates, the Sollich warms the reduced calorie flavored confectionery composition to 73° F. (22.8° C.). The final four plates are used to condition the flavored confectionery composition.

After cooling in molds for about 90 minutes at 65° F. (18.3° C.) under a fan (run at about 2 m/s), the reduced calorie flavored confectionery product transforms sufficiently to its stable β-3 phase to be demolded manually after 15 minutes of cooling at 45° F. (7.2° C.) under a fan (run at about 2 m/s) with good gloss. All samples are without bloom and will pass both thermal stress tests mentioned in Example 1.

What is claimed is:

1. A process for preparing a bloom-stable, flavored confectionery composition which contains reduced calorie cocoa butter substitute fat in the stable #-3 phase, which process comprises:
    (I) forming a temperable, flavored confectionery composition which comprises:
      A) a flavor enhancing amount of a flavor component;
      B) from about 15% to about 45% of a fat component comprising:
        (i) at least about 70% by weight of the fat component of a reduced calorie cocoa butter substitute fat having:
          (a) at least about 85% by weight of the substitute fat of combined MLM and MML triglycerides;
          (b) no more than about 10% by weight of the substitute fat of combined LLM and LML triglycerides;
          (c) no more than about 4% by weight of the substitute fat of MMM triglycerides; and
          (d) no more than about 10% by weight of the substitute fat of other triglycerides;
          wherein in said triglycerides M is a $C_6$ to $C_{10}$ saturated fatty acid residue and L is a $C_{20}$ to $C_{24}$ saturated acid residue; and
          wherein said triglycerides are further characterized by having a fatty acid composition which comprises
            (x) from about 35% to about 60% combined $C_8$ and $C_{10}$ saturated fatty acids,
            (y) a ratio of $C_8$ to $C_{10}$ saturated fatty acids of from about 1:5 to about 25:1,
            (z) from about 35% to about 60% behenic fatty acid;
        (ii) up to about 20% by weight of the fat component of milkfat;
        (iii) up to about 20% by weight of the fat component of cocoa butter; and
        (iv) no more than about 4% by weight of the fat component of diglycerides; and
      C) from about 55% to about 85% other nonfat confectionery ingredients;
    (II) dynamically tempering the flavored confectionery composition of Step (I) by cooling said composition from a non-crystalline state to a temperature of less than about 21.1° C. at a rate of from about 0.4° C./min. to about 83° C./min. while simultaneously working said composition to impart shear agitation thereto to the extent of shear rates ranging from about 400 to about 8000 sec$^{-1}$, and by thereafter conditioning said composition for at least about 5 minutes by agitating and warming said composition to a temperature of from about 21.1° C. to about 29.4° C.; and thereafter (III) setting the tempered composition by cooling and/or warming the tempered composition from Step (II) in a manner such that the reduced calorie cocoa butter substitute fat transforms into a stable $\beta$-3 crystalline phase.

2. A process according to claim 1 wherein the composition of Step (I) comprises from about 0.1% to about 25% of a chocolate flavor component.

3. A process according to claim 2 wherein in tempering Step (II) the chocolate-flavored confectionery composition is cooled from the non-crystalline state to a temperature of from about 12.8° C. to about 21.1° C., in a period of from about 4 to about 25 minutes while working said composition by imparting shear agitation thereto to the extent of shear rates ranging from about 500 to about 6000 sec$^{-1}$.

4. A process according to claim 3 wherein in tempering Step (II) the cooling and subsequent conditioning of the agitated chocolate-flavored confectionery composition are carried out in one or more swept-wall, scraped-wall, or screw-type heat exchangers.

5. A process according to claim 4 wherein in Step (II) the cooling and conditioning steps are carried out in different zones of the same heat exchanger.

6. A process according to claim 5 wherein the heat exchanger employed in carrying out the Step (II) cooling and conditioning steps is a swept-wall tempering unit.

7. A process according to claim 4 wherein in Step (II) the cooling and conditioning steps are carried out in at least two different heat exchangers.

8. A process according to claim 3 wherein in the chocolate-flavored confectionery composition of Step (I) the fat component comprises:
   (1) at least about 75% of a reduced calorie cocoa butter substitute fat having:
      (a) at least about 90% by weight of combined MLM and MML triglycerides;
      (b) no more than about 6% by weight of combined LLM and LML triglycerides;
      (c) no more than about 3% by weight of MMM triglycerides; and
      (d) no more than about 7% by weight of other triglycerides; and
   wherein said triglycerides are further characterized by having a fatty acid composition which comprises
      (x) from about 40% to about 60% combined $C_8$ and $C_{10}$ saturated fatty acids,
      (y) a ratio of $C_8$ to $C_{10}$ saturated fatty acids of from about 1:3 to about 19:1, and
      (z) from about 40% to about 60% behenic acid;
   (2) up to about 14% by weight of the fat component of milkfat;
   (3) up to about 14% by weight of the fat component of cocoa butter; and
   (4) no more than about 2% by weight of the fat component of diglycerides.

9. A process according to claim 8 wherein in the chocolate-flavored confectionery composition of Step (I) the triglycerides forming the reduced calorie cocoa butter substitute fat are characterized by a fatty acid composition which comprises no more than about 10% $C_6$ saturated fatty acid, no more than about 10% $C_{20}$ saturated fatty acid, no more than about 4% $C_{24}$ saturated fatty acid, and no more than about 9% other fatty acids.

10. A process according to claim 9 wherein in the chocolate-flavored confectionery composition of Step (1) the nonfat confectionery ingredients comprise from about 35% to about 60% sugars, sugar alcohols, reduced-calorie sweeteners, and/or partially digestible or nondigestible carbohydrate bulking or bodying agents.

11. A process according to claim 10 wherein the nonfat confectionery ingredients of the Step (I) confectionery composition also include up to about 1.5% emulsifiers.

12. A process according to claim 11 wherein the nonfat confectionery ingredients of the Step (I) confectionery composition also include up to about 20% milk solids.

13. A process for preparing a bloom-stable, chocolate-flavored confectionery composition which contains reduced calorie cocoa butter substitute fat in the stable $\beta$-3 phase, which process comprises:
   (1) forming a temperable chocolate-flavored confectionery composition which comprises:
      A) from about 0.1% to about 25% of a chocolate flavor component;
      B) from about 15% to about 45% of a fat component comprising:
         (i) at least about 80% by weight of the fat component of a reduced calorie cocoa butter substitute fat having:
            (a) at least about 94% by weight of the substitute fat of combined MLM and MML triglycerides;
            (b) no more than about 2% by weight of the substitute fat of combined LLM and LML triglycerides;
            (c) no more than about 2% by weight of the substitute fat of MMM triglycerides; and
            (d) no more than about 5% by weight of the substitute fat of other triglycerides;
         wherein in said triglycerides M is a $C_6$ to $C_{10}$ saturated fatty acid residue and L is a $C_{20}$ to $C_{24}$ saturated acid residue; and
         wherein said triglycerides are further characterized by having a fatty acid composition which comprises
            (x) from about 45% to about 55% combined $C_8$ and $C_{10}$ saturated fatty acids,
            (y) a ratio of $C_8$ to $C_{10}$ saturated fatty acids of from about 1:2 to about 2:1, and
            (z) from about 40% to about 50% behenic fatty acid;
         (ii) up to about 14% by weight of the fat component of milkfat;
         (iii) up to about 14% by weight of the fat component of cocoa butter; and
         (iv) no more than about 1% by weight of the fat component of diglycerides; and
      C) from about 55% to about 85% other nonfat confectionery ingredients;
   (2) dynamically tempering the chocolate-flavored composition of Step (1) by cooling said composition from a non-crystalline state to a temperature of from about 12.8° C. to about 21.1° C. in a period of from about 4 to about 25 minutes while simultaneously working said composition to impart shear agitation thereto to the extent of shear rates ranging from about 500 to about 6000 sec$^{-1}$, and by thereafter conditioning said composition for at least about 5 minutes by agitating and warming said composition to a temperature of from about 21.1° C. to about 29.4° C.; and thereafter (3) setting the tempered chocolate-flavored composition by cooling and/or warming the tempered composition from Step (2) in a manner such that the reduced calorie cocoa butter substitute fat transforms into a stable $\beta$-3 crystalline phase.

14. A process according to claim 13 wherein in the chocolate-flavored confectionery composition of Step (1) the triglycerides forming the reduced calorie cocoa butter substitute fat are characterized by a fatty acid composition which comprises no more than about 5% $C_6$ saturated fatty acid, no more than about 6% $C_{20}$ saturated fatty acid, no more than about 2% $C_{24}$ saturated fatty acid, and no more than about 5% other fatty acids.

15. A process according to claim 14 wherein in the tempering Step (2) the cooling of the chocolate-flavored confectionery composition is carried out in one or more swept-wall, scraped-wall, or screw-type heat exchangers.

16. A process according to claim 15 wherein in the tempering Step (2) the cooling of the chocolate-flavored confectionery composition is carried out in a heat exchanger of the Sollich Turbo Temperer, Aasted tempering unit, Votator "A" unit, Girdler "A" unit, or Groen Model #DR(C) type.

17. A process according to claim 16 wherein in the tempering Step (2) the cooled chocolate-flavored confectionery composition is subsequently conditioned by agitating and warming said composition to a temperature of from about 21.1° C. to 25.6° C. using a heat exchanger selected from a Sollich Turbo Temperer, an Aasted tempering unit, a Votator "B" unit picker box, a Girdler "B" unit picker box, or a Krueter temper kettle.

18. A process according to claim 17 wherein the conditioning part of the tempering Step (2) is carried out for at least 30 minutes.

19. A process according to claim 17 wherein during the setting Step (3) the chocolate-flavored confectionery composition is cooled for from about 15 to about 270 minutes in an environment having a temperature of about 21.1° C. or less prior to packaging said confectionery composition.

20. A process according to claim 19 wherein during the setting Step (3) the chocolate-flavored confectionery composition is cooled for from about 15 to 100 minutes at a temperature of about 18.3° C. and is subsequently cooled for from about 2 to 15 minutes at a temperature of about 7.2° C. or less.

21. A bloom-stable, flavored confectionery composition which contains reduced calorie cocoa butter substitute fat in the stable $\beta$-3 crystalline phase, which composition comprises tempered, set composition prepared by a process according to claim 1.

22. A bloom-stable, chocolate-flavored confectionery composition which contains reduced calorie cocoa butter substitute fat in the stable $\beta$-3 crystalline phase, which composition comprises the tempered, set composition prepared by a process according to claim 8.

23. A bloom-stable, chocolate-flavored confectionery composition which contains reduced calorie cocoa butter substitute fat in the stable $\beta$-3 crystalline phase, which composition comprises the tempered, set composition prepared by a process according to claim 13.

24. A bloom-stable, chocolate-flavored confectionery composition which contains reduced calorie cocoa butter substitute fat in the stable $\beta$-3 crystalline phase, which composition comprises the tempered, set composition prepared by a process according to claim 20.

* * * * *